United States Patent
Yoshida et al.

(10) Patent No.: US 7,064,788 B2
(45) Date of Patent: Jun. 20, 2006

(54) ELECTRONIC CAMERA WITH REPEATING FLASH

(75) Inventors: Yutaka Yoshida, Asaka (JP); Takaaki Kotani, Asaka (JP); Naoyuki Nishino, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 652 days.

(21) Appl. No.: 10/106,492

(22) Filed: Mar. 27, 2002

(65) Prior Publication Data

US 2002/0140845 A1    Oct. 3, 2002

(30) Foreign Application Priority Data

Mar. 30, 2001 (JP) ............................. 2001-100494
Nov. 28, 2001 (JP) ............................. 2001-362611

(51) Int. Cl.
*H04N 3/14* (2006.01)
*H04N 5/335* (2006.01)

(52) U.S. Cl. ...................... 348/296; 348/370; 348/371

(58) Field of Classification Search ............... 348/296, 348/298, 311; 357/370–371
See application file for complete search history.

(56) References Cited

U.S. PATENT DOCUMENTS

| 5,638,118 | A  | * | 6/1997 | Takahashi et al. | ........ 348/221.1 |
| 6,278,490 | B1 | * | 8/2001 | Fukuda et al. | .............. 348/362 |
| 6,744,471 | B1 | * | 6/2004 | Kakinuma et al. | .......... 348/371 |
| 6,753,920 | B1 | * | 6/2004 | Momose et al. | ............ 348/371 |
| 6,850,282 | B1 | * | 2/2005 | Makino et al. | ............. 348/371 |
| 2001/0028397 | A1 | * | 10/2001 | Nakamura | ................... 348/222 |
| 2002/0101532 | A1 | * | 8/2002 | Takayama et al. | .......... 348/362 |
| 2004/0056975 | A1 | * | 3/2004 | Hata | .......................... 348/371 |

FOREIGN PATENT DOCUMENTS

| JP | 2000-196951 | * 12/1998 |
| JP | 2000-196951 | 7/2000 |

* cited by examiner

*Primary Examiner*—David Ometz
*Assistant Examiner*—Hung Lam
(74) *Attorney, Agent, or Firm*—Young & Thompson

(57) ABSTRACT

An electronic camera is provided with an image pickup sensor, a flash repeating an emission of a flashlight plural times according to a light emission timing pulse which repeats plural times, a photographic lens leading photographic light to an image pickup sensor in which the photographic light is composed of external light and a reflected light of a flashlight emitted by the flash, and an MPU generating a light emission timing pulse according to a timing based on a generation timing of an action timing pulse and controlling a timing for emitting a flash light emitted by the flash.

9 Claims, 9 Drawing Sheets

ELECTRONIC CAMERA WITH REPEATING FLASH

BACKGROUND OF THE INVENTION

1. Field of the Invention

The present invention relates to an electronic camera having an image pickup sensor such as CMOS image pickup sensor.

2. Description of the Related Art

Conventionally, a CCD image pickup element as a solid-state image sensing device which converts the photographic light coming through a photographic lens to an electrical signal has been used for an electronic camera. However, in recent years, the number of cases in which a CMOS image pickup sensor is used has been increasing for the reason that it is inexpensive, does not require a complicated timing generation circuit, operates using only a single power source and consumes a small quantity of electric power and the like. Also, the CMOS image pickup sensor has a characteristic that it can take in only an optional area of the CMOS image pickup sensor as an image, while the CCD image pickup element does not have such characteristic. For example, Japanese Patent Laid Open Gazette 2000-196951 has proposed a technique for, prior to an emission of a flashlight, executing a previous light emission, reading an electrical signal originated from photoelectric charge stored according to the quantity of light received at the center portion of the CMOS image pickup sensor, and appropriately setting exposure and white balance of an electronic camera or a focus position of a lens based on the read electrical signal.

FIG. 10 is a view showing a state that the CMOS image pickup sensor receives a quantity of light emitted in a previous light emission, as proposed in Japanese Patent Laid Open Gazette 2000-196951.

The CMOS image pickup sensor 101 shown in FIG. 10 part (a) has plural photo detector element lines including lines from n to n+m which are respectively composed of plural arranged photo detector elements. FIG. 10 part (a) shows a block 101a that is in the center of the CMOS image pickup sensor 101, and composed of the above lines from n to n+m. Also, FIG. 10 part (b) shows timing signals n, . . . , and n+m reading the block 101a of the CMOS image pickup sensor 101 and sequentially shifted (delayed) in the direction of the time axis, and a previous light emission pulse for executing a previous light emission in the portion where these timing signals n, . . . , and n+m overlap each other.

In this CMOS image pickup sensor 101, by activating the respective plural photo detector element lines (lateral lines in FIG. 10) according to sequential timings shifted in the direction of the time axis, photographic light coming through a photographic lens is stored as photoelectric charge. Accordingly, there occurs a so-called a focus plane accumulation phenomenon in which an image pick up timing is different for each photo detector element line in the CMOS image pickup sensor 101 (the image pickup time of the upper portion is different from that of the lower portion in the CMOS image pickup sensor 101). Then, as shown in the part (b) of FIG. 10, the previous light emission in the portion where the timing signals from n to n+m are overlapping is executed, the photoelectric charge based on the photographic light composed of the external light and the reflected light of the previous light emission is evenly stored in the entire block 101a, and further, a voltage signal based on the photoelectric charge evenly stored is read, and whereby exposure and white balance of an electronic camera in a usual flashlight emission and a focus position of a lens are set.

In the above-described technique, since the photoelectric charge based on the photographic light composed of the external light and the reflected light of the previous light emission is evenly stored in the entire block 101a of the CMOS image pickup sensor 101, exposure, white balance in a usual flashlight emission and a focus position of a lens can be appropriately set. When photography based on the photographic light composed of the external light and the reflected light of the flashlight using this technique is performed, as long as the shutter time is relatively long and the time for storing photoelectric charge by the CMOS image pickup sensor is longer than the photographic time of the entire picture (1 frame), there is a timing in which all the timing signals for storing the photoelectric charge overlap each other, and therefore, a flashlight may be emitted according to such timing. However, when a high-speed shutter motion is performed and the shutter time is relatively short, there is a case that there is no timing in which all the timing signals for storing the photoelectric charge overlap each other. In this case, if a flashlight is emitted according to an arbitrary timing, the CMOS image pickup sensor stores the mixed photoelectric charge including the photoelectric charge based on the photographic light composed of the external light and the reflected light of the flashlight and the photoelectric charge based on the external light only, thereby a problem of deterioration in picture quality occurs.

Also, it is conceivable that a relatively inexpensive CMOS image pickup sensor mounted on a camera for a personal computer or a portable phone is built in an electronic camera. However, owing to a structural reason, such inexpensive CMOS image pickup sensor needs to be operated in a relatively short shutter time, and accordingly, still there is a case that there is no timing in which all the timing signals for storing the photoelectric charge overlap each other. This is a factor that prevents lowering the cost of an electronic camera.

SUMMARY OF THE INVENTION

In view of the above-described drawback, it is an object of the present invention to provide an electronic camera that can emit a flashlight according to an appropriate timing even if a high-speed shutter motion is performed, and improves its picture quality with lower costs.

To obtain the above object, an electronic camera according to the present invention comprising:

an image pickup sensor having a plurality of photo detector element lines respectively composed of a plurality of arranged photo detector elements, in accordance with each of a plurality of action timing pulses which is different for each of the photo detector element lines, receiving light by each of the photo detector elements that compose each of the photo detector element lines corresponding to each of the action timing pulses for only a predetermined shutter time, and outputting one after another signals corresponding to the respective photo detector elements according to a quantity of the light received during the shutter time;

a flash repeating an emission of a flashlight a plurality of times according to a light emission timing pulse repeating a plurality of times;

a photographic lens leading photographic light to the image pickup sensor, in which the photographic light is composed of external light and a reflected light of the flashlight emitted from the flash; and a light emission controller generating the light emission timing pulse at a timing based on a generation timing of the action timing pulse, and controlling a light emission timing of the flashlight emitted by the flash.

Here, as a typical example of the above image pickup sensor, there is a CMOS image pickup sensor.

The electronic camera of the present invention performs emission of a flashlight in accordance with a light emission timing pulse that is generated at a timing based on a generation timing of each action timing pulse which is different for each photo detector element line. Therefore, even when a high-speed shutter motion is performed and a shutter time is relatively short, photoelectric charge based on photographic light composed of external light and a reflected light of a flashlight can be stored in any photo detector element line of the image pickup sensor, and further quality of picture can be improved. Also, it is possible to use a relatively inexpensive CMOS image pickup sensor that is mounted on a camera for a personal computer or a portable phone, and accordingly, the cost of an electronic camera can be lowered.

Here, it is preferable that the light emission controller generates the light emission timing pulse at intervals of length integer times including once or 1/integer times as long as that of generation intervals of the action timing pulse.

If the light emission controller is provided in this way, even when the shutter time is changed, storing of the photoelectric charge into the image pickup sensor by the flashlight can be constant.

It is also preferable that the above electronic camera comprises a monitor unit monitoring a quantity of the flashlight emitted by the flash, and the light emission controller controls the flashlight so that the same quantity of flashlight is repeatedly emitted a plurality of times based on monitoring of the quantity of light performed by the monitor unit.

Discharging of electric power stored in advance in the main capacitor toward a light emission tube performs an emission of a flashlight repeatedly emitted plural times. Therefore, the electric power (voltage) of the main capacitor decreases as time passes. Then, if the flashlight is controlled so that the same quantity of flashlight is emitted plural times, for any photo detector element line of the image pickup sensor, the same quantity of flashlight can be emitted. Accordingly, quality of picture can be further improved.

Furthermore, the light emission controller may control a pulse width of a light emission timing pulse repeating plural times, based on monitoring of the quantity of light performed by the monitor unit, so that the same quantity of flashlight is repeatedly emitted plural times.

When the light emission controller is provided in the above way, for example, as shown in an embodiment which will be described later, it is possible to easily configure a circuit for controlling the flashlight in order that the same quantity of flashlight is repeatedly emitted plural times.

DETAILED DESCRIPTION OF THE PREFERRED EMBODIMENTS

Figure 1:
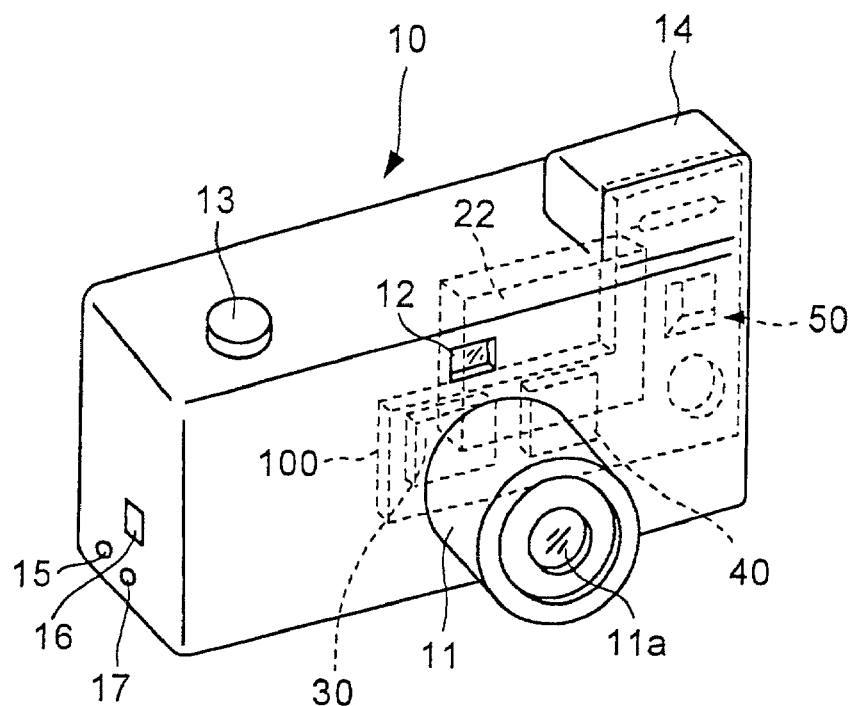
FIG. 1 is an external perspective view obtained by obliquely overlooking an electronic camera in an embodiment of the present invention from its front surface.

FIG. 1 is an external perspective view obtained by obliquely overlooking an electronic camera in an embodiment of the present invention from its front surface.

In the center of the front surface in an electronic camera 10, a lens barrel 11 having a photographic lens 11a in its inside is provided. Also, the electronic camera 10 has a CMOS image pickup sensor 30 mounted on a circuit board 100, an MPU (Micro Processor Unit) 40 and a flashlight emitting unit 50. Further, a recording medium 22 that is freely removable is mounted on the electronic camera 10. In the recording medium 22, imagery of a subject image coming through the photographic lens 11a is made, and subject image information changed into an electrical signal through the CMOS image pickup sensor 30 is recorded via the MPU 40.

Also, an optical finder objective window 12 is provided on the upper portion of the front surface of the electronic camera 10. In addition, a shutter button 13 is provided on the top surface of the electronic camera 10.

Further, on the top surface of the electronic camera 10, there is provided a flash 14 that includes the flashlight emitting unit 50 and repeats a flashlight emission plural times according to a light emission timing pulse repeating plural times.

Furthermore, on the side surface of the electronic camera 10, there are provided an image output terminal 15 that is connected to a cable for outputting an image signal of a subject photographed by the electronic camera 10 to a television, a projector, etc., a USB terminal 16 that is connected to a cable for outputting an image signal of a subject photographed by the electronic camera 10 to a personal computer etc. with a USB (Universal Serial Bus) terminal and inputting an image signal to the electronic camera 10 from the personal computer etc., and a power input terminal 17 that is connected to a cable for supplying external power like AC power supply etc. to the electronic camera 10.

Figure 2:
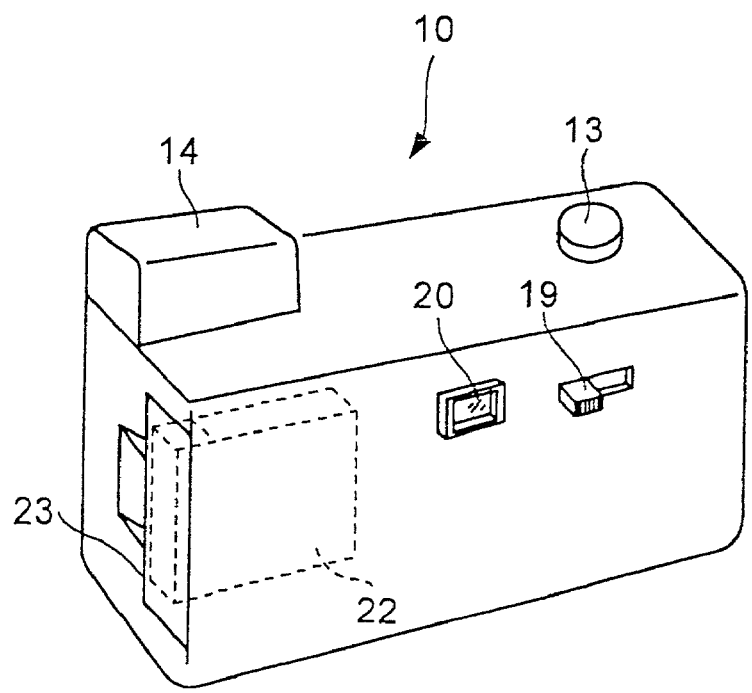
FIG. 2 is an external perspective view obtained by obliquely overlooking the electronic camera shown in FIG. 1 from its back.

FIG. 2 is an external perspective view obtained by obliquely overlooking the electronic camera shown in FIG. 1 from its back.

On the back surface of the electronic camera 10, there are a power switch 19 to let the electronic camera 10 operate, and the optical finder eyepiece window 20.

Also, on the side surface of the electronic camera 10, there is provided a recording medium insertion opening cover 23 for protecting the built-in recording medium 22.

Figure 3:
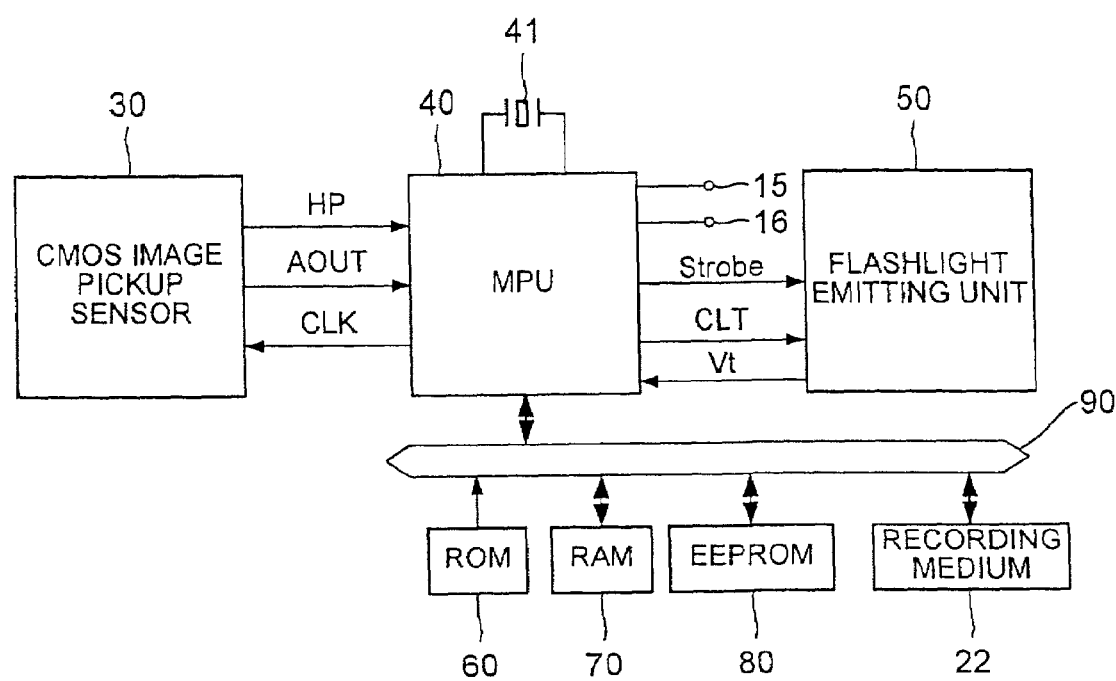
FIG. 3 is a block diagram showing a circuit configuration of the electronic camera shown in FIG. 1.

FIG. 3 is a block diagram showing a circuit configuration of the electronic camera shown in FIG. 1.

The CMOS image pickup sensor 30 shown in FIG. 3 has, although the details will be described later, plural photo detector element lines composed of plural arranged photo detector elements. Also, the CMOS image pickup sensor 30 accepts input of a clock CLK from the MPU 40, generates each action timing pulse HP that is different for each photo detector element line, according to that each action timing pulse HP, receives light by the respective photo detector elements composing each photo detector element line corresponding to each action timing pulse HP for only a predetermined shutter time, and outputs one after another analog signals AOUT of the respective photo detector elements corresponding to the quantity of light received during the shutter time.

Also, a crystal oscillator 41 generating an oscillation signal of a predetermined standard oscillation frequency, the above-described image output terminal 15, the USB terminal 16 and the flashlight emitting unit 50 are connected to the MPU 40. In addition, a ROM 60, a RAM 70, an EEPROM 80 and the above-described recording medium 22 are connected to the MPU 40 via a bus 90.

The MPU 40 reads a program stored in the ROM 60 and executes various kinds of digital signal processing corresponding to the program. Also, the MPU 40 operates as a light emission controller of the present invention, although the details will be described later, accepts input of an action timing pulse HP from the CMOS image pickup sensor 30, generates a light emission timing pulse Strobe according to a timing based on the generation timing of the action timing pulse HP and outputs the generated Strobe to the flashlight emitting unit 50, and controls a light emission timing of the flashlight emitted by the flash 14. Further, the MPU 40 outputs a pressure up control signal CNT to the flashlight emitting unit 50 as well as accepts input of a charging voltage detection signal Vt from the flashlight emitting unit 50. These pressure up control signal CNT and charging voltage detection signal Vt will be described later.

In the ROM 60, a program for performing control of the entire electronic camera is stored.

In the RAM 70, a work area and the like where the MPU 40 executes various kinds of processing are provided.

In the EEPROM 80, solid data and the like specific to this electronic camera are stored.

In the flashlight emitting unit 50, there are provided a booster circuit which boosts a charging voltage to be applied to the main capacitor (which will be described later) according to a pressure up control signal CNT sent from the MPU 40, a charging voltage detection circuit which detects the magnitude of the charging voltage and outputs it as a charging voltage detection signal Vt to the MPU 40, a light emission tube which emits a flashlight according to a light emission timing pulse Strobe sent from the MPU 40, and the like.

Figure 4:
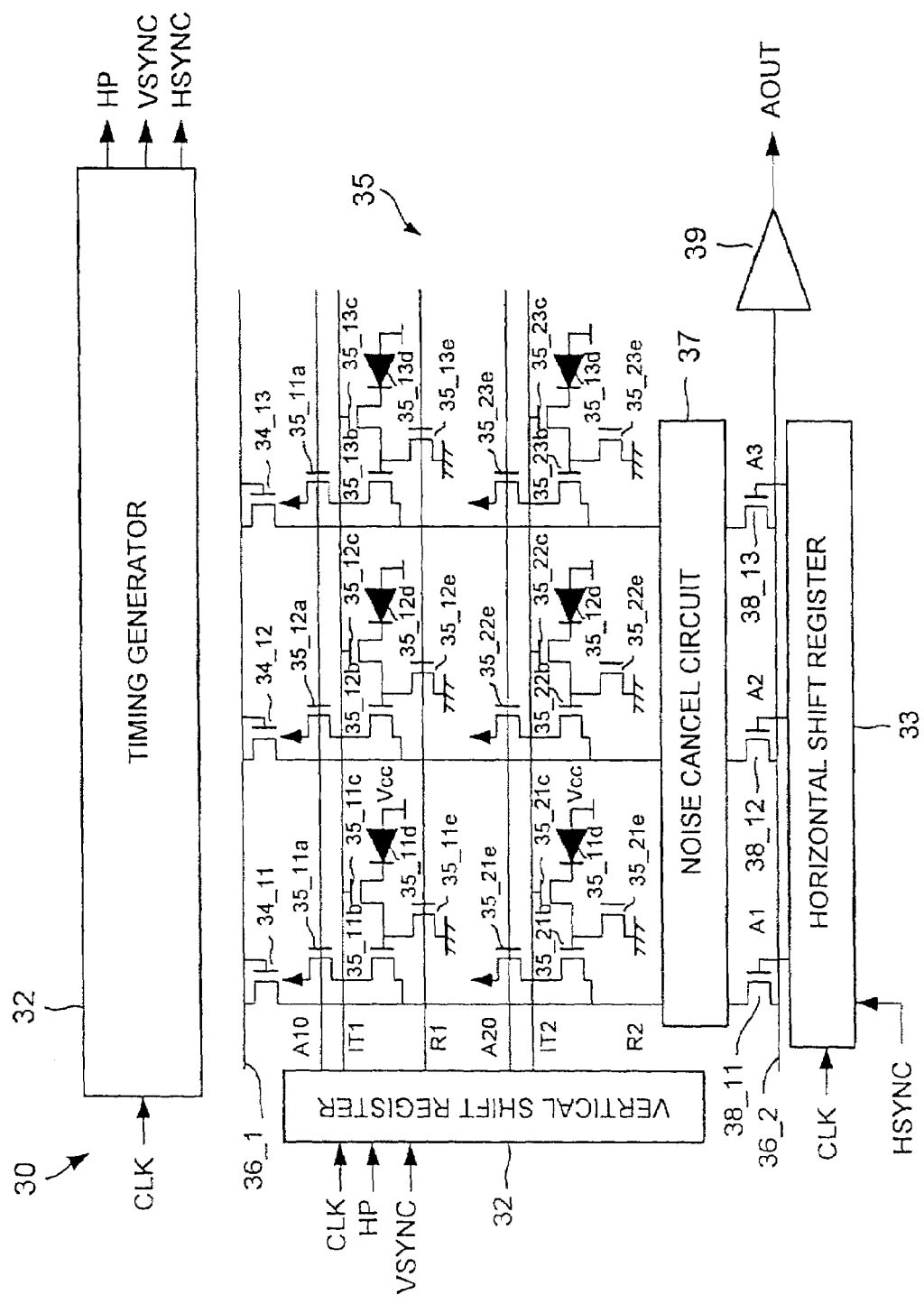
FIG. 4 is a circuit diagram of a CMOS image pickup sensor.

FIG. 4 is a circuit diagram of a CMOS image pickup sensor.

In the CMOS image pickup sensor 30 shown in FIG. 4, there are provided a timing generator 31, a vertical shift register 32, a horizontal shift register 33, a matrix portion 35 composed of 3×2 pixels (although n×n pixels are actually provided, 3×2 pixels will be used for convenience of explanation here), a noise cancel circuit 37, a power line 36_1 having predetermined electrical potential, load transistors 34_11, 34_12 and 34_13 connected to the power line 36_1, a transfer line 36_2 that transfers a voltage signal from each pixel, load transistors 38_11, 38_12 and 38_13 connected to the transfer line 36_2, and an integrator 39.

The matrix portion 35 has the first line composed of the first, second and third pixels, and the second line composed of the fourth, fifth and sixth pixels. The first pixel is composed of an address transistor 35_11a, a photoelectric charge amplifying transistor 35_11b, a load transistor 35_11c, a photo diode 35_11d (an example of the photo detector element according to the present invention) and a reset transistor 35_11e, the second pixel is composed of an address transistor 35_12a, a photoelectric charge amplifying transistor 35_12b, a load transistor 35_12c, a photo diode 35_12d and a reset transistor 35_12e, and the third pixel is composed of an address transistor 35_13a, a photoelectric charge amplifying transistor 35_13b, a load transistor 35_13c, a photo diode 35_13d and a reset transistor 35_13e. Further, the fourth pixel is composed of an address transistor 35_21a, a photoelectric charge amplifying transistor 35_21b, a load transistor 35_21c, a photo diode 35_21d and a reset transistor 35_21e, the fifth pixel is composed of an address transistor 35_22a, a photoelectric charge amplifying transistor 35_22b, a load transistor 35_22c, a photo diode 35_22d and a reset transistor 35_22e, and the sixth pixel is composed of an address transistor 35_23a, a photoelectric charge amplifying transistor 35_23b, a load transistor 35_23c, a photo diode 35_23d and a reset transistor 35_23e.

The timing generator 31 accepts input of a clock CLK from the MPU 40, and based on this clock CLK, generates an action timing pulse HP, a vertical synchronizing signal VSYNC and a horizontal synchronizing signal HSYNC.

To the vertical shift register 32, a clock CLK, an action timing pulse HP and a vertical synchronizing signal VSYNC are input. As will be described later, the vertical shift register 32 first outputs reset signals R1 and R2 sequentially and then outputs photoelectric charge storing signals IT1 and IT2 sequentially which are synchronized with an action timing pulse HP, and further, outputs address signals A10 and A20 sequentially which are synchronized with a vertical synchronizing signal VSYNC.

To the horizontal shift register 33, a clock CLK and a horizontal synchronizing signal HSYNC are input. Also as will be described later, the horizontal shift register 33 outputs sampling signals A1, A2 and A3 sequentially during the address signal A10 synchronized with the first horizontal synchronizing signal HSYNC is being output, and further, outputs sampling signals A1, A2 and A3 sequentially during the address signal A20 synchronized with the second horizontal synchronizing signal HSYNC is being output.

The noise cancel circuit 37 plays a part for canceling signal errors (noise) between each one of pixels.

The integrator 39 integrates signals from the noise cancel circuit 37 which are transferred sequentially on the transfer line 36_2 by sampling signals A1, A2 and A3, and generates an analog signal AOUT to output to the MPU 40.

Figure 5:
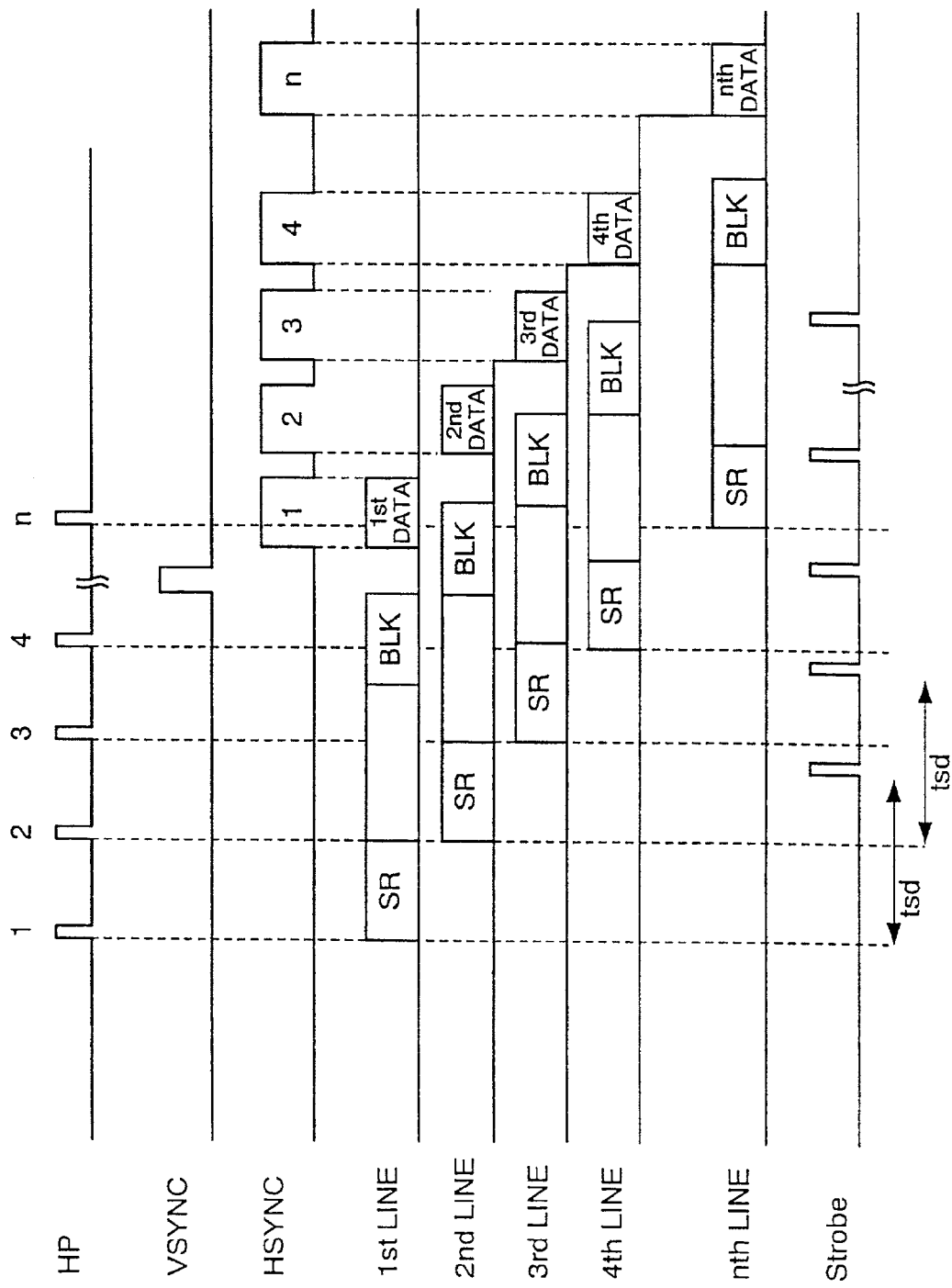
FIG. 5 is a view showing a timing chart of the CMOS image pickup sensor shown in FIG. 4 when the high-speed shutter motion is performed as well as a flashlight emission is performed plural times.

FIG. 5 is a view showing a timing chart of the CMOS image pickup sensor shown in FIG. 4 when the high-speed shutter motion is performed as well as a flashlight emission is performed plural times.

During the period from rising of the first action timing pulse HP to rising of the second action timing pulse HP as shown in FIG. 5, a reset signal R1 for the first line is output from the vertical shift register 32. Then, the reset transistors 35_11e, 12e and 13e of the first line go into ON state, and photoelectric charge stored in each pixel of the first line is discharged (refer to a sensor reset SR shown in FIG. 5).

Next, for only a predetermined time starting from rising of the second action timing pulse HP, a photoelectric charge storing signal IT1 is output from the vertical shift register 32. Then, the load transistors 35_11c, 12c and 13c begin to operate, so that photoelectric conversion of the light being incident onto the photo diode 35_11d, 12d and 13d is performed, the converted light is amplified by the photoelectric charge amplifying transistors 35_11b, 12b and 13b, and storing of the photoelectric charge begins. Here, after a predetermined time tsd starting from rising of the first action timing pulse HP has passed, a flashlight is emitted by a light emission timing pulse Strobe generated in the MPU 40. Note that the light emission timing pulse Strobe is generated at intervals of length once as long as that of the generation intervals for a generation timing of the action timing pulse HP. That is, the light emission timing pulse Strobe is generated every time, after the predetermined time tsd starting from rising of the action timing pulse HP has passed. Accordingly, in the first line, the photoelectric charge based on the photographic light composed of the external light and the reflected light of the flashlight is stored. After the photoelectric charge storing signal IT1 is output for the predetermined time, processing for making a frame be on the blanking (BLK) state is executed.

Further, like the first line, processing of the second line is executed. That is, for a period starting from rising of the second action timing pulse HP to rising of the third action timing pulse HP, a reset signal R2 for the second line is output from the vertical shift register 32, the reset transistors 35_21e, 22e and 23e go into ON state, and photoelectric charge stored in each pixel of the second line is reset. Subsequently, for only a predetermined time starting from rising of the third action timing pulse HP, a photoelectric charge storing signal IT2 is output from the vertical shift register 32, the load transistors 35_21c, 22c and 23c begin to operate, photoelectric conversion of the light being incident onto the photo diode 35_21d, 22d and 23d is performed, photoelectric charge amplifying transistors 35_21b, 22b, and 23b amplify the converted light, and storing of the photoelectric charge begins. Also, after a predetermined time tsd starting from rising of the second action timing pulse HP has passed, a flashlight is emitted by a light emission timing pulse Strobe. Accordingly, also in the second line, photoelectric charge based on the photographic light composed of the external light and the reflected light of the flashlight is stored. After that, processing for making a frame go into the blanking (BLK) state is executed. Similarly, the processing is executed with respect to the third, fourth, . . . , up to nth line, and in any of these lines, the photoelectric charge based on the photographic light composed of the external light and the reflected light of the flashlight is stored. In this way, the photoelectric charge is stored in the CMOS image pickup sensor 30.

Here, as shown in FIG. 5, the photoelectric charge stored in the first line is transferred to the horizontal shift register 33 as well as output to the MPU 40, after a succession of the sequence of the first line is finished. That is, a vertical synchronizing signal VSYNC is output from the timing generator 31 to the vertical shift register 32. Then, the vertical shift register 32 outputs an address signal A10 synchronized with the vertical synchronizing signal VSYNC. As a result, the address transistors 35_11a, 12a and 13a go into ON state, and electrical signals corresponding to the photoelectric charge stored in the first line are input to the load transistors 38_11, 38_12 and 38_13 via the noise cancel circuit 37.

Next, the first horizontal synchronizing signal HSYNC is output from the timing generator 31 to the horizontal shift register 33. Then, the horizontal shift register 33 outputs sampling signals A1, A2 and A3 one after the other. As a result, the load transistors 38_11, 38_12 and 38_13 go into ON state, and voltage signals that have been input to the load transistors 38_11, 38_12 and 38_13 are transferred to the transfer line 36_2 and integrated by the integrator 39 to output an analog signal AOUT of 1stDATA. Similarly, the second, third, fourth, . . . , and nth horizontal synchronizing signals HSYNC are output from the timing generator 31 to the horizontal shift register 33, and then, analog signals AOUT of 2ndDATA, 3rdDATA, 4thDATA, . . . , and nthDATA are output. In this way, in the CMOS image pickup sensor 30, transfer to the horizontal shift register 33 as well as transfer of the data transferred to the horizontal shift register 33 to the outside (MPU 40) are performed for each line. Therefore, although a succession of an operation including storing of photoelectric charge in each line is sequentially shifted by one line, since a flashlight is emitted by a light emission timing pulse Strobe generated according to a timing based on a generation timing of each action timing pulse HP which is different in each photo detector element line, even when a high-speed shutter motion is performed and a shutter time is relatively short, photoelectric charge based on photographic light composed of external light and a reflected light of a flashlight is stored in any photo detector element line of the CMOS image pickup sensor 30.

Note that the width of the above-described action timing pulse HP is within the range of about 10 µS–20 µS. Also, the length of the interval between each action timing pulse HP is about 100 µS. Further, as shown in FIG. 5, n indicating the last action timing pulse HP, the last horizontal synchronizing signal HSYNC and the last line is 480.

Figure 6:
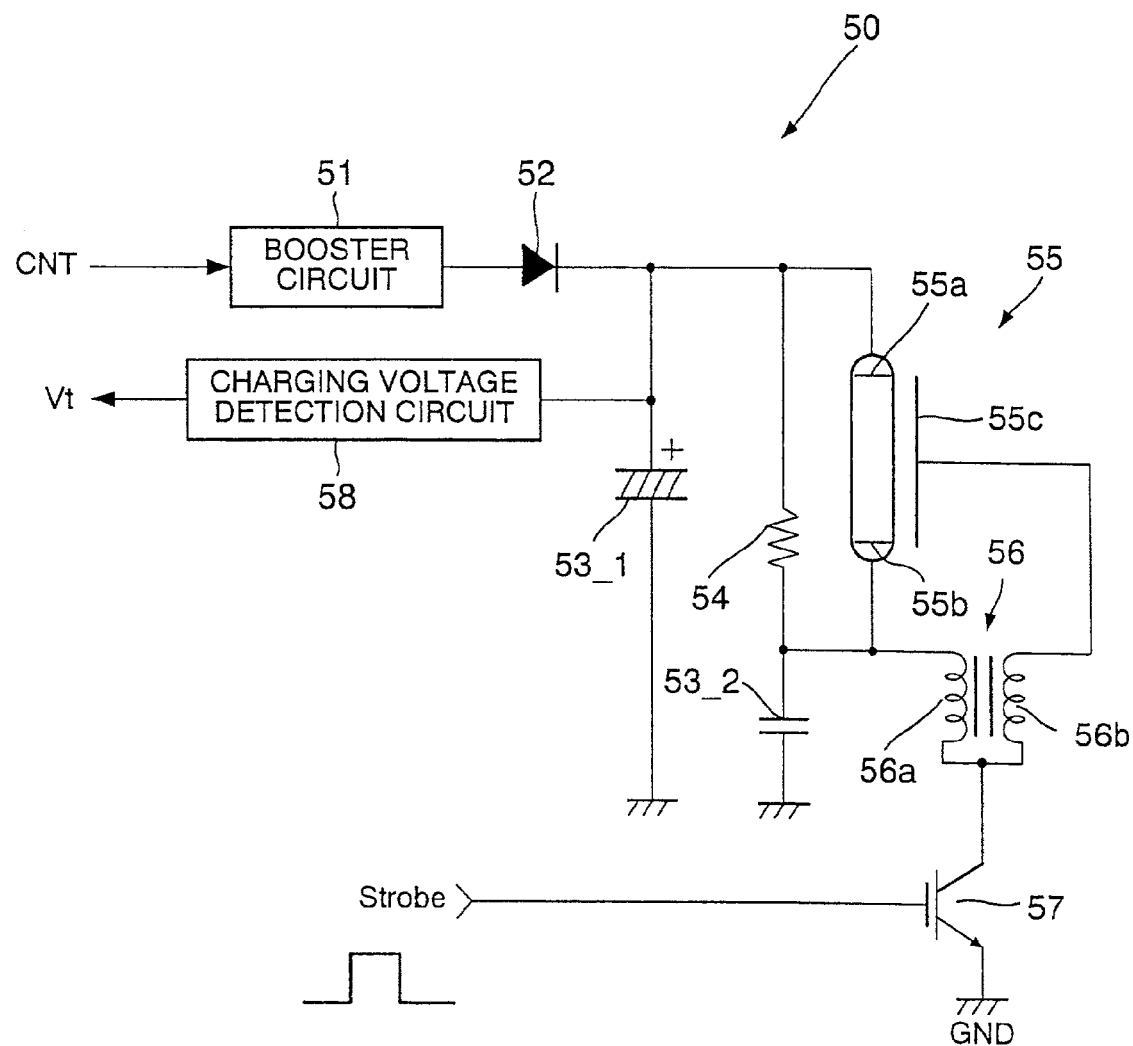
FIG. 6 is a view showing a flash emitting unit constituting a flash of the camera shown in FIG. 1.

FIG. 6 is a view showing a flash emitting unit constituting a flash of the electronic camera shown in FIG. 1.

The flashlight emitting unit 50 in FIG. 6 has a booster circuit 51 to which a pressure up control signal CNT from the MPU 40 is input. The booster circuit 51 boosts up a voltage from a built-in battery (not shown) up to a predetermined voltage level according to a pressure up control signal CNT. Also, the flashlight emitting unit 50 has a main capacitor 53_1 for storing the voltage boosted up by the booster circuit 51 via a diode 52. To both ends of the main capacitor 53_1, a resistance element 54 and a trigger capacitor 53_2 are connected in series.

Further, in the flashlight emitting unit 50, a light emission tube 55, a trigger coil 56, and an IGBT element 57 are provided.

The light emission tube 55 has an anode 55a, a cathode 55b and a side electrode 55c, and a xenon (XE) gas is enclosed in its inside. The light emission tube 55 emits light by the electric power discharged from the main capacitor 53_1. Also, the trigger coil 56 has a primary side winding 56a having a predetermined winding number, and a secondary side winding 56b of which winding number is larger than that of the primary side winding 56a. One end of the primary side winding 56a is connected to the cathode 55b of the light emission tube 55, and further to a connection point connecting the resistance element 54 and the trigger capacitor 53_2. On the other hand, one end of the secondary side winding 56b is connected to the side electrode 55c of the light emission tube 55. The respective other ends of the primary side winding 56a and secondary side winding 56b are connected to a collector of the IGBT element 57. To the base of the IGBT element 57, a light emission timing pulse Strobe is input.

Also, the flashlight emitting unit 50 has a charging voltage detection circuit 58. The charging voltage detection circuit 58 detects a voltage of the main capacitor 53_1 and outputs the detected voltage signal Vt to the MPU 40. The MPU 40 inputs a pressure up control signal CNT having the volume corresponding to this voltage Vt into the above-described booster circuit 51, and thereby controls the voltage of the main capacitor 53_1.

Next, performance of the flashlight emitting unit 50 will be explained.

When the shutter button 13 is pressed, an order to start photography is given. Then, a light emission timing pulse Strobe from the MPU 40 is input to the base of the IGBT element 57, the IGBT element 57 goes into ON state, and photoelectric charge stored in the trigger capacitor 53_2 is discharged through the route of the primary side winding 56a of the trigger coil 56→IGBT element 57→ground GND. As a result, current flows into the primary side winding 56a, and electromotive force is elicited in the secondary side winding 56b. Here, the winding number of the secondary side winding 56b is larger than that of the primary side winding 56a, thereby the electromotive force elicited in the secondary side winding 56b is amplified to become large. Since such large electromotive force is given to the side electrode 55c of the light emission tube 55 as a trigger voltage, the xenon gas enclosed in the light emission tube 55 is excited, and a discharge current IC flows through the route of the plus (+) side of the main capacitor 53_1→anode 55a of the light emission tube 55→cathode 55b of the light emission tube 55→primary side winding 56a of the trigger coil 56→IGBT element 57→ground GND, so that a flashlight (flash) is emitted from the light emission tube 55. Here, a light emission timing pulse Strobe to be input to the IGBT element 57 is, as shown in FIG. 5, input at intervals of length once as long as that of generation intervals for generation timing of the action timing pulse HP. Therefore, even when a high-speed shutter motion is performed and a shutter time is relatively short, photoelectric charge based on photographic light composed of external light and a reflected light of a flashlight is stored in any photo detector element line of the CMOS image pickup sensor 30.

Figure 7:
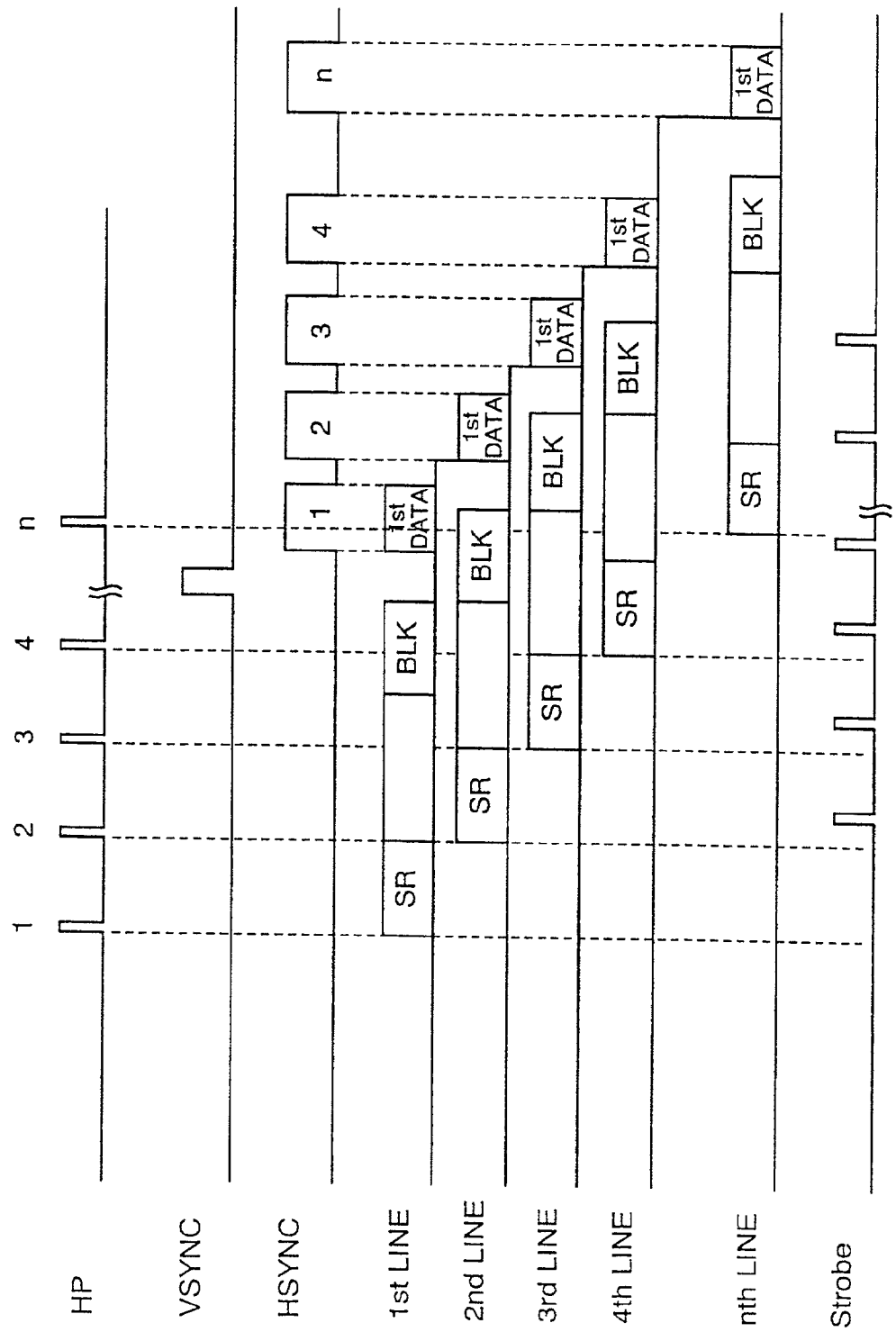
FIG. 7 is a view showing a timing chart of the CMOS image pickup sensor, which is different from the timing chart shown in FIG. 5.

FIG. 7 is a view showing a timing chart of the CMOS image pickup sensor, which is different from the timing chart shown in FIG. 5.

In FIG. 5, the light emission timing pulse Strobe was explained using an example that is generated at intervals of length once as long as that of generation intervals of generation timing for an action timing pulse HP. In FIG. 7, a light emission timing pulse Strobe is generated at intervals of length ½ times as long as that of generation intervals of generation timing for an action timing pulse HP. Therefore, in any line of the CMOS image pickup sensor 30, two flashlights are emitted due to two light emission timing pulses Strobe.

Note that, on the contrary, a light emission timing pulse Strobe may be generated at intervals of length two or more (integer) times as long as that of generation intervals of generating timing for an action timing pulse HP. In this case, in order that the quantity of flashlight is constant in each photo detector element line, a shutter time needs to be longer than a generation timing of a light emission timing pulse Strobe. As described above, if it is provided that a light emission timing pulse Strobe is generated at intervals of length integer times including once or 1/integer times as long as that of the generation intervals of an action timing pulse HP, the quantity of flashlight in each photo detector element line can be constant. Also, when it is provided that the shutter time is to be changed, by changing generation intervals of an action timing pulse HP according to the changed time, the number of contribution times to storing photoelectric charge can be constant regardless of the shutter time. On the contrary, if it is provided that generation intervals of an action timing pulse HP is not changed even when the shutter times is changed, it is possible to increase the quantity of flashlight in connection with the shutter time. In this case, since it is provided that the quantity of flashlight is to be changed in connection with the shutter time (not to be dispersed) by preference, a light emission timing pulse Strobe is desired to be shorter than a generation interval of an action timing pulse HP.

Figure 8:
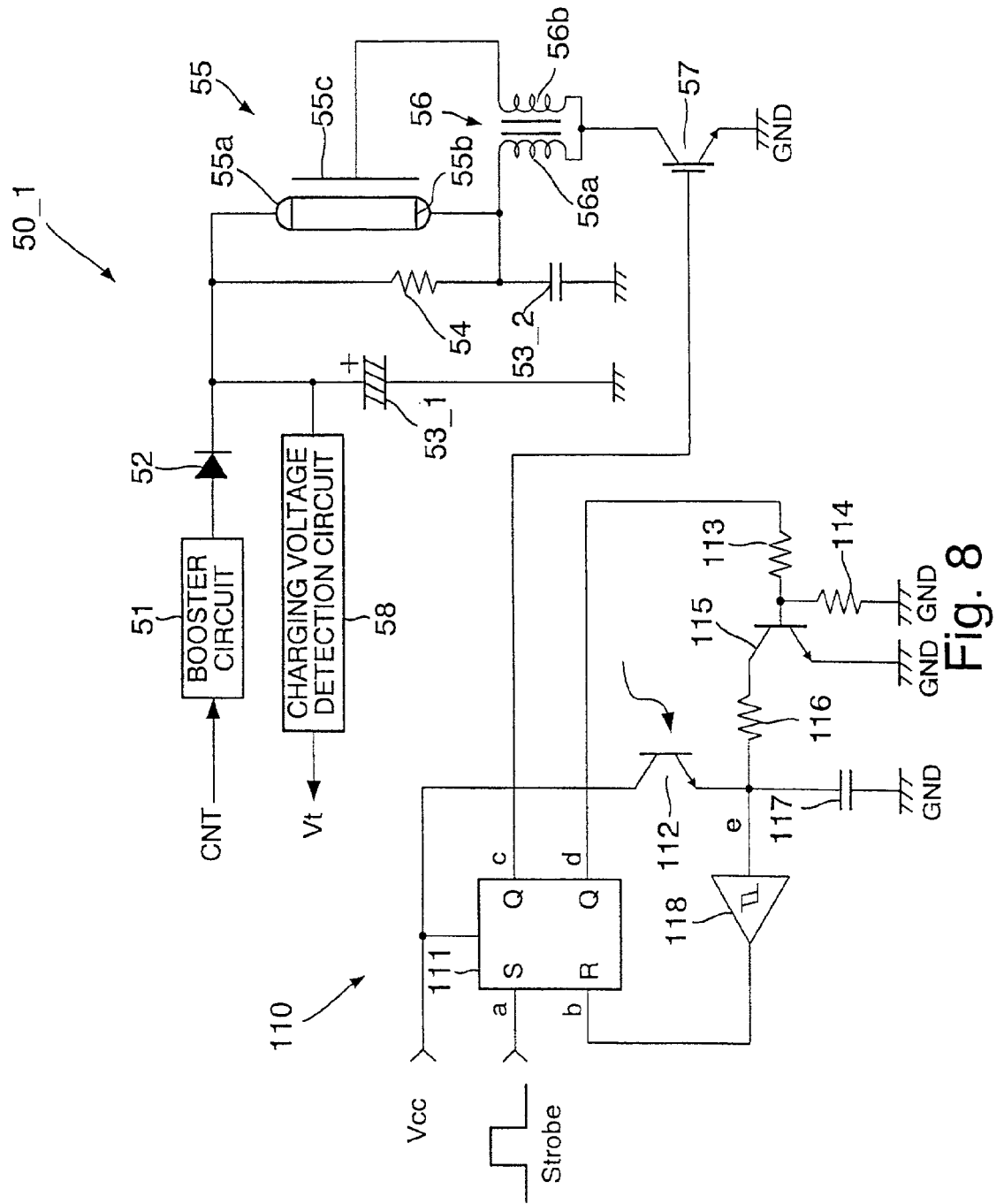
FIG. 8 is a view showing a flash emitting unit different from the flash emitting unit shown in FIG. 6.

FIG. 8 is a view showing a flash emitting unit different from the flash emitting unit shown in FIG. 6.

The flashlight emitting unit 50_1 shown in FIG. 8 has, in addition to the elements composing the flashlight emitting unit 50 shown in FIG. 6, a monitor unit 110 monitoring the quantity of a flashlight repeatedly emitted plural times. The flashlight emitting unit 50_1 controls the flashlight, based on a result of light quantity monitoring performed by the monitor unit 110, so that the same quantity of flashlight is emitted repeatedly plural times. Specifically, the flashlight emitting unit 50_1 controls the pulse width of a light emission timing pulse Strobe repeating plural times, based on a result of light quantity monitoring performed by the monitor unit 110, so that the same quantity of flashlight can be repeatedly emitted plural times. More specifically, it controls the flashlight in order that the same quantity of flashlight synchronized with rising of the light emission timing pulse Strobe is emitted repeatedly plural times. Further details will be explained as follows.

In the monitor unit 110, there is provided a flip-flop 111 to which a power supply Vcc is applied and in which a light emission timing pulse Strobe is input to a set terminal S. A positive phase output terminal Q of the flip-flop 111 is connected to the base of the IGBT element 57.

Also, in the monitor unit 110, there are provided a photo transistor 112 and an integrating capacitor 117 both connected between the power supply Vcc and a ground GND in series. A flashlight emitted from the light emission tube 55 is input to the photo transistor 112.

Further, in the monitor unit 110, there are a resistance element 113 of which one end is connected to a negative phase output terminal Q_ of the flip-flop 111, a resistance element 114 connected between the other end of the resistance element 113 and the ground GND, a transistor 115 of which base is connected to the connection point between the resistance elements 113 and 114 as well as its emitter is connected to the ground GND.

Also, in the monitor unit 110, there are provided a resistance element 116 of which one end is connected to the collector of the transistor 115 as well as its other end is connected to the connection point between the photo transistor 112 and the integrating capacitor 117, and a Schmitt trigger element 118 of which input side is connected to the connection point connecting the photo transistor 112, the integrating capacitor 117 and the resistance element 116 as well as its output side is connected to a reset terminal R of the flip-flop 111. Operation of the monitor unit 110 configured as described above will be explained referring to FIG. 9 as follows.

Figure 9:
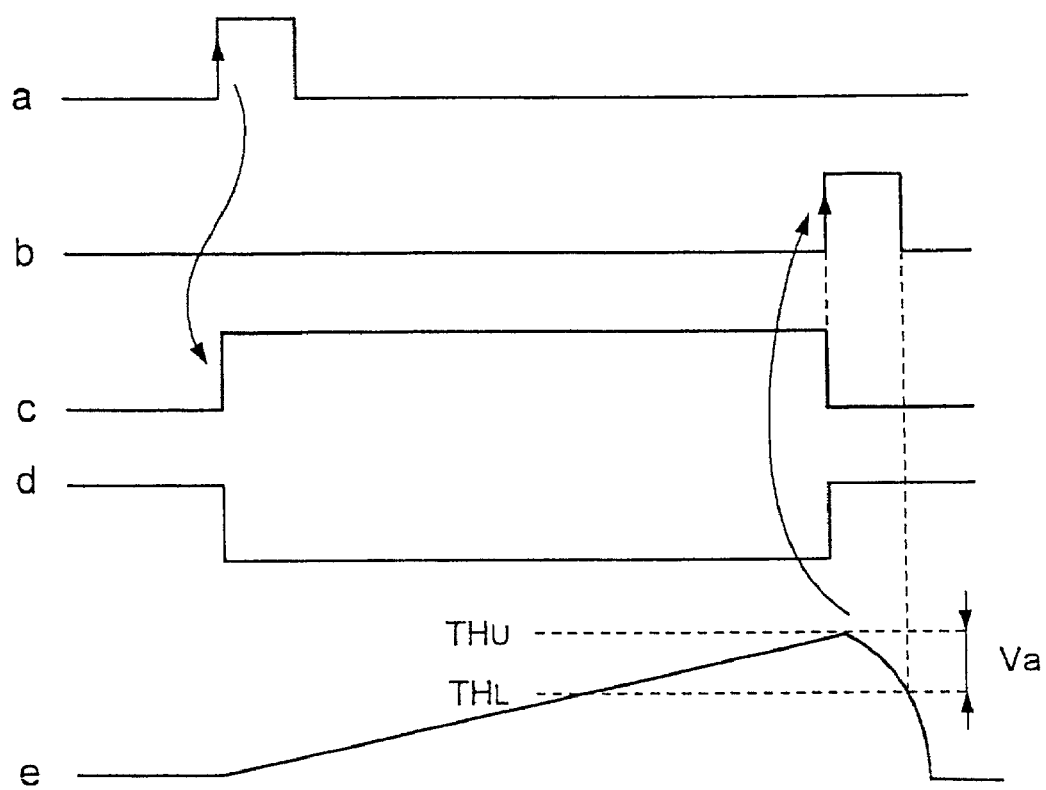
FIG. 9 is a view showing a wave pattern of each node in the monitor unit shown in FIG. 8.
Figure 10:
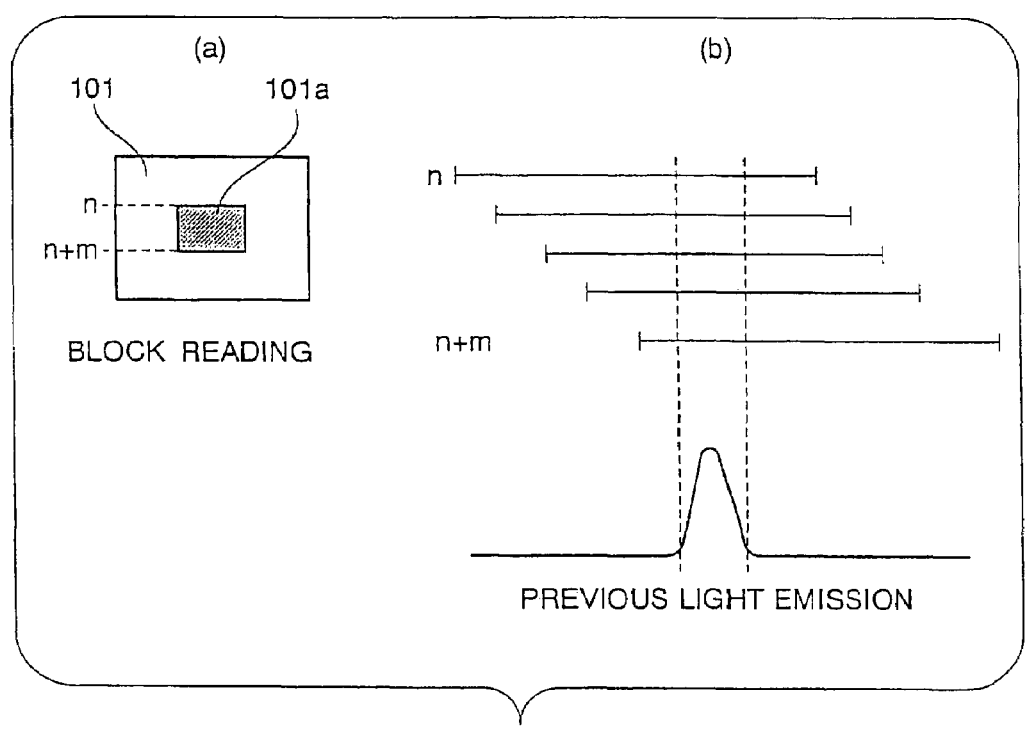
FIG. 10 is a view showing a state that the CMOS image pickup sensor receives a quantity of light emitted in a previous light emission, as proposed in Japanese Patent Laid Open Gazette 2000-196951.

FIG. 9 is a view showing a wave pattern of each node in the monitor unit shown in FIG. 8.

At the initial point, the flip-flop 111 is in the reset state, and as shown in FIG. 9, a signal of a node c at the positive phase output terminal Q is at the level "L" and that of a node d at the negative phase output terminal Q_ is at the level "H", respectively. Since the signal at the level "L" of the node c has been input to the base of the IGBT element 57, the IGBT element 57 is in OFF state. Therefore, a flash has not been emitted from the light emission tube 55, and the photo transistor 112 is in OFF state.

Also, since the signal at the level "H" of the node d has been input to the base of the transistor 115 via the resistance element 113, the transistor 115 is in ON state. Therefore, electric charge of the integrating capacitor 117 has been fully discharged, and the electrical potential of a node e is at the level "L". Therefore, the signal at the level "L" has been output from the Schmitt trigger element 118, and a node b as the reset terminal R of the flip-flop 111 is at the level "L".

Here, a light emission timing pulse Strobe is input to the set terminal S of the flip-flop 111. Then, rising of the light emission timing pulse Strobe sets the flip-flop 111, thereby the signal of the node c at the positive phase output terminal Q of the flip-flop 111 goes into the level "H". Since this signal at the level "H" is input to the base of the IGBT element 57, the IGBT element 57 goes into ON state, and a flashlight is emitted from the light emission tube 55. The emitted flashlight is received by the photo transistor 112, and thereby the photo transistor 112 goes into the state in which it discharges photocurrent according to light intensity.

Also, the signal of the node d at the negative phase output terminal Q_ of the flip-flop 111 changes into the level "L". Since this signal at the level "L" is input to the base of the transistor 115 via the resistance element 113, the transistor 115 goes into OFF state. As a result, charging current (photocurrent) flows into the integrating capacitor 117 through the route of the power supply Vcc→photo transistor 112→ground GND, the integrating capacitor 117 starts being charged with electric charge (integrated), and the electrical potential of the node e starts increasing gradually as shown in FIG. 9.

Here, the Schmitt trigger element 118 has an upper part threshold $TH_U$ which is a threshold changing from the level "H" to the level "L" and a lower part threshold $TH_L$ which is a threshold changing from the level "H" to the level "L". Also, the Schmitt trigger element 118 has a predetermined hysteresis band Va between the upper part threshold $TH_U$ and the lower part threshold $TH_L$. If the electrical potential of the node e rises and reaches the upper part threshold $TH_U$ of the Schmitt trigger element 118, the level of the signal being output from the Schmitt trigger element 118 changes from "L" to "H". As a result, the node b goes into the level "H", that is, the reset terminal R of the flip-flop 111 goes into the level "H", and the flip-flop 111 is reset. Then, the node c goes into the level "L", the IGBT element 57 goes into OFF state, and the flashlight from the light emission tube 55 stops. Accompanying the above process, the photo transistor 112 goes into OFF state. Also, the level of the node d becomes "H", and thereby the transistor 115 goes into ON state, and discharge of the electric charge stored in the integrating capacitor 117 via the resistance element 116 starts.

At the time when a predetermined time has passed since the discharge of the electric charge stored in the integrating capacitor 117 started and the node e has reached the lower part threshold $TH_L$ of the Schmitt trigger element 118, the signal at the level "H" from the Schmitt trigger element 118 changes into the level "L". Thereby, the level of the node b changes into the level"L", and the flip-flop 111 becomes ready for input of the next light emission timing pulse Strobe. In the flashlight emitting unit 50_1, the pulse width of a light emission timing pulse Strobe repeating plural times is controlled by the monitor unit 110 so that the same quantity of flashlight is emitted repeatedly plural times. By controlling the pulse width in this way, in any photo detector element line of the CMOS image pickup sensor 30, photoelectric charge by a flashlight can be constantly stored in a simple circuit configuration.

Note that, although in the flashlight emitting unit 50_1, control for attaining that the same quantity of flashlight is repeatedly emitted plural times was explained using an example in which a flashlight from the light emission tube 55 is directly received by the photo transistor 112, such control may be performed by detecting magnetic flux of the trigger coil 56 or current flowing into the IGBT element 57 which are generated at the time when the light emission tube 55 is emitting a flashlight. Also, such control may be performed using a photo detector element that receives a flashlight reflected at the subject, instead of using the photo transistor 112 that directly receives a flashlight from the light emission tube 55.

Although the present embodiment was explained using an example in which the present invention was applied to an electronic camera having three kinds of terminals which are an image output terminal 15, a USB terminal 16 and a power input terminal 17, the application of the present invention is not limited to this type. The present invention can be applied to any types of electronic cameras such as one having digital terminals including terminals for serial connection and parallel connection to a personal computer and the like, one having an audio output terminal to which a cable for outputting an audio signal is connected, and the like.

Also, the present invention is not limited to a stand-alone electronic camera as described in the present embodiment, but can be applied to, for example, an electronic camera having terminals which are connected to external devices to input and output signals, and having functions of a portable information-processing terminal for processing digital information such as characters, images, etc.

What is claimed is:
1. An electronic camera comprising:
   an image pickup sensor having n photo detector element lines where n>2, each of the photo detector element lines comprising a plurality of arranged photo detector elements so as to form a matrix of the photo detector elements, a different action timing pulse being associated with each of the n photo detector element lines during exposure of an entire picture, each of the different action timing pulses being triggered at a different time, all of the photo detector elements within a given said photo detector element line converting incident light into respective photoelectric charges only when triggered by the action timing pulse associated with the given photo detector element line during a predetermined shutter time;
   a flash repeating an emission of a flashlight a plurality of times during the exposure of the entire picture according to a light emission timing pulse repeating a plurality of times;
   a photographic lens leading photographic light to the image pickup sensor in which the photographic light is composed of external light and a reflected light of the flashlight emitted from the flash; and
   a light emission controller generating the light emission timing pulse at a timing based on a generation timing of the action timing pulse, and controlling a light emission timing of the flashlight emitted by the flash.

2. The electronic camera according to claim 1 further comprises a monitor unit monitoring a quantity of the flashlight emitted by the flash,
wherein the light emission controller controls the flashlight so that the same quantity of flashlight is repeatedly emitted a plurality of times, based on monitoring of the quantity of light performed by the monitor unit.

3. The electronic camera according to claim 2, wherein the light emission controller controls a pulse width of a light emission timing pulse repeating a plurality of times, based on monitoring of the quantity of light performed by the monitor unit, so that the same quantity of flashlight is repeatedly emitted a plurality of times.

4. The electronic camera of claim 1, wherein the light emission controller is constructed and arranged to generate the light emission timing pulse at a rate proportional to a rate at which the action timing pulse is generated so as to ensure that an equal amount of light from the flash is emitted during each said predetermined shutter time of the photo detector element lines.

5. The electronic camera according to claim 4, wherein the light emission controller generates the light emission timing pulse at a frequency that is m times a frequency of the action timing pulse, where m is an integer greater than 1, so that a plurality of said flash emissions take place while each of the photo detector element lines is converting the incident light into the photoelectric charges.

6. The electronic camera according to claim 4, wherein the light emission controller generates the light emission timing pulse at a frequency that is 1/m times a frequency of the action timing pulse, where m is an integer greater than 1, with each said flash emission timed to occur when more than one of the photo detector element lines is converting the incident light into the photoelectric charges.

7. An electronic camera comprising:
an image pickup sensor comprising a plurality of photo detector elements arranged into a plurality of lines to form a matrix, each line being only one said element wide;
a timing generator producing an output that sequentially selects each one of the lines so that each said photo detector element within a currently selected said line generates an output based on light falling upon said photo detector element;
a flash strobe device;
a photographic lens arranged to pass photographic light to the image pickup sensor, the photographic light including external light and reflected light emitted by the flash strobe device; and
a flash controller connected so as to cause the flash device to produce a separate strobe of flash light as each said line is selected by the timing generator.

8. The electronic camera according to claim 7 further comprises a monitor unit monitoring a quantity of the flashlight emitted by the flash strobe device,
wherein the flash controller controls the flashlight so that the same quantity of light from the flash strobe device is repeatedly emitted a plurality of times, based on monitoring of the quantity of light performed by the monitor unit.

9. The electronic camera according to claim 8, wherein the flash controller controls a pulse width of a light emission timing pulse repeating a plurality of times, based on monitoring of the quantity of light performed by the monitor unit, so that the same quantity of light from the flash strobe device is repeatedly emitted a plurality of times.

* * * * *